US012725551B2

(12) United States Patent
Pyo et al.

(10) Patent No.: US 12,725,551 B2
(45) Date of Patent: Sep. 1, 2026

(54) GAMMA VOLTAGE CORRECTION DEVICE AND GAMMA VOLTAGE CORRECTION METHOD FOR DISPLAY DEVICE

(71) Applicant: Samsung Display Co., Ltd., Yongin-si (KR)

(72) Inventors: Sibeak Pyo, Yongin-si (KR); Sungjin Kim, Yongin-si (KR); Hyosang Yang, Yongin-si (KR); Eunjung Oh, Yongin-si (KR); Seungkyu Lee, Yongin-si (KR); Yoongyu Lee, Yongin-si (KR); Hyelim Lee, Yongin-si (KR); Younwoo Choe, Yongin-si (KR); Hyunseok Hong, Yongin-si (KR); Younguk Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/455,240

(22) Filed: Aug. 24, 2023

(65) Prior Publication Data

US 2024/0071277 A1 Feb. 29, 2024

(30) Foreign Application Priority Data

Aug. 25, 2022 (KR) ........................ 10-2022-0107178
Feb. 6, 2023 (KR) ........................ 10-2023-0015729

(51) Int. Cl.
*G09G 3/20* (2006.01)
*G09G 3/3233* (2016.01)

(52) U.S. Cl.
CPC ......... *G09G 3/2003* (2013.01); *G09G 3/3233* (2013.01); *G09G 2320/0276* (2013.01); *G09G 2320/0673* (2013.01); *G09G 2320/0693* (2013.01); *G09G 2360/14* (2013.01)

(58) Field of Classification Search
None
See application file for complete search history.

(56) References Cited

U.S. PATENT DOCUMENTS 8,982,164 B2 3/2015 Pyo
9,208,718 B2 12/2015 Pyo
9,478,166 B2 10/2016 Pyo et al.
10,446,117 B2 10/2019 Choi
(Continued)

FOREIGN PATENT DOCUMENTS

CN 112199065 A 1/2021
CN 114974073 A 8/2022
(Continued)

*Primary Examiner* — Dorothy Harris
(74) *Attorney, Agent, or Firm* — Womble Bond Dickinson (US) LLP

(57) ABSTRACT

In a gamma voltage correction method for a display device including a first display area and a second display area, the gamma voltage correction method includes: correcting a gamma voltage for each sub-pixel of the first display area based on measured light characteristics of a first area of the first display area in a plurality of gray levels; and correcting a gamma voltage for each sub-pixel of the second display area based on measured light characteristics of a second area of the first display area around the second display area and measured light characteristics of the second display area in the plurality of gray levels.

20 Claims, 11 Drawing Sheets

(56) References Cited

U.S. PATENT DOCUMENTS

| | | | | |
|---|---|---|---|---|
| 11,067,853 | B1 * | 7/2021 | Mei | G09G 3/2092 |
| 11,151,928 | B2 | 10/2021 | Lee | |
| 11,462,143 | B2 * | 10/2022 | Wu | G09G 3/20 |
| 11,610,528 | B2 | 3/2023 | Kim et al. | |
| 2006/0256054 | A1 * | 11/2006 | Baek | G09G 3/2003 345/88 |
| 2010/0026731 | A1 * | 2/2010 | Konuma | G09G 5/04 345/690 |
| 2015/0138251 | A1 | 5/2015 | Pyo | |
| 2016/0196793 | A1 * | 7/2016 | Xu | G09G 3/3611 345/694 |
| 2017/0206825 | A1 * | 7/2017 | Cha | G09G 3/2092 |
| 2017/0249890 | A1 * | 8/2017 | Yoo | G09G 3/2077 |
| 2017/0316744 | A1 * | 11/2017 | Oh | G09G 3/2007 |
| 2017/0345377 | A1 * | 11/2017 | Oh | G09G 3/3291 |
| 2018/0204524 | A1 * | 7/2018 | Kucera | G09G 3/30 |
| 2019/0103073 | A1 * | 4/2019 | Choi | G09G 5/14 |
| 2019/0206335 | A1 * | 7/2019 | Wu | G09G 3/3426 |
| 2020/0135147 | A1 * | 4/2020 | Tang | G09G 5/10 |
| 2021/0065625 | A1 * | 3/2021 | Wang | H10K 59/35 |
| 2021/0233449 | A1 * | 7/2021 | Zuo | G09G 3/344 |
| 2021/0358379 | A1 * | 11/2021 | Li | H10K 59/121 |
| 2022/0139336 | A1 * | 5/2022 | Jeon | G09G 3/3208 345/694 |
| 2022/0157236 | A1 * | 5/2022 | Feng | G09G 3/3233 |
| 2022/0198977 | A1 * | 6/2022 | Kim | G09G 3/20 |
| 2022/0301482 | A1 * | 9/2022 | Wang | G09G 3/006 |
| 2024/0144848 | A1 * | 5/2024 | Lee | G09G 3/3233 |

FOREIGN PATENT DOCUMENTS

| | | | |
|---|---|---|---|
| KR | 10-1914936 | B1 | 11/2018 |
| KR | 10-2139693 | B1 | 7/2020 |
| KR | 10-2021-0069141 | A | 6/2021 |
| KR | 10-2022-0087670 | A | 6/2022 |
| WO | WO 2022/001321 | A1 | 1/2022 |

* cited by examiner

GAMMA VOLTAGE CORRECTION DEVICE AND GAMMA VOLTAGE CORRECTION METHOD FOR DISPLAY DEVICE

CROSS-REFERENCE TO RELATED APPLICATIONS

The present application claims priority to and the benefit of Korean Patent Application No. 10-2022-0107178, filed in the Korean Intellectual Property Office on Aug. 25, 2022, and Korean Patent Application No. 10-2023-0015729, filed in the Korean Intellectual Property Office on Feb. 6, 2023, the entire disclosure of each of which is incorporated herein by reference.

BACKGROUND

1. Field

Aspects of one or more embodiments relate to a display device.

2. Description of the Related Art

Display devices generally include pixels, and each of the pixels may include a light-emitting element and transistors for driving the light-emitting element. Due to deviations or variability of component functionality as a result of the manufacturing process, deviations may occur in image quality characteristics.

The above information disclosed in this Background section is only for enhancement of understanding of the background and therefore the information discussed in this Background section does not necessarily constitute prior art.

SUMMARY

Aspects of one or more embodiments relate to a display device, and for example, to a gamma voltage correction device and a gamma voltage correction method for a display device.

Aspects of one or more embodiments include a gamma voltage correction device and a gamma voltage correction method for a display device, whereby gamma characteristics and image quality of the display device may be relatively improved.

Additional aspects will be set forth in part in the description which follows and, in part, will be apparent from the description, or may be learned by practice of the presented embodiments of the disclosure.

According to some embodiments of the present disclosure, a gamma voltage correction method for a display device, includes correcting a gamma voltage for each sub-pixel of a first display area based on measured light characteristics of a first area of a first display area in a plurality of gray levels, and correcting a gamma voltage for each sub-pixel of a second display area based on measured light characteristics of a second area of the first display area around a second display area and measured light characteristics of the second display area in the plurality of gray levels.

According to some embodiments, the correcting of the gamma voltage of the first display area may include receiving measured light characteristics of the first area in each of reference gray levels of the plurality of gray levels, and correcting a gamma voltage for each sub-pixel corresponding to each of the reference gray levels for the first display area based on the measured light characteristics of the first area and preset first target light characteristics.

According to some embodiments, the correcting of the gamma voltage of the second display area may include receiving measured light characteristics of the second area and the second display area from each of reference gray levels of the plurality of gray levels, setting measured light characteristics of the second area as second target light characteristics, and correcting a gamma voltage for each sub-pixel corresponding to each of the reference gray levels for the second display area based on the measured light characteristics of the second area and preset second target light characteristics.

According to some embodiments, the light characteristics may include luminance and color coordinates.

According to some embodiments, the first area may be an area within a first distance from the center of the first display area.

According to some embodiments, the center of the second area may be located in an area excluding the second display area in an area within a second distance from a center of the second display area.

According to some embodiments, the second distance may be twice or more of a radius of the second display area.

According to some embodiments, a gamma voltage for each sub-pixel of the first display area and the second display area may be corrected in each of a plurality of reference gray levels among the plurality of gray levels.

According to some embodiments, a gamma voltage for each sub-pixel for each of gray levels except for the reference gray levels among the plurality of gray levels may be corrected by interpolation of gamma voltages for each sub-pixel of the reference gray levels.

According to some embodiments, a plurality of second areas may be designated, and an average of measured light characteristics of a plurality of second areas may be set as the second target light characteristics.

According to some embodiments of the present disclosure, a gamma voltage correction device includes a measurement unit configured to measure light characteristics of a display panel, the display panel including a first display area and a second display area, and a correction unit configured to correct a gamma voltage for each sub-pixel of the first display area based on measured light characteristics of a first area of the first display area and correcting a gamma voltage for each sub-pixel of the second display area based on measured light characteristics of a second area of the first display area around the second display area and measured light characteristics of the second display area.

According to some embodiments, the correction unit may receive measured light characteristics of the first area in each of reference gray levels of the plurality of gray levels, and may correct a gamma voltage for each sub-pixel corresponding to each of the reference gray levels for the first display area based on the measured light characteristics of the first area and preset first target light characteristics.

According to some embodiments, the correction unit may receive measured light characteristics of the second area from each of reference gray levels of the plurality of gray levels, may set measured light characteristics of the second area as second target light characteristics, and may correct a gamma voltage for each sub-pixel corresponding to each of the reference gray levels for the second display area based on the measured light characteristics of the second display area and the second target light characteristics.

According to some embodiments, the light characteristics may include luminance and color coordinates.

According to some embodiments, the first area may be an area within a first distance from the center of the first display area.

According to some embodiments, the center of the second area may be located in an area excluding the second display area in an area within a second distance from a center of the second display area.

According to some embodiments, the second distance may be twice or more of a radius of the second display area.

According to some embodiments, the correction unit may correct a gamma voltage for each sub-pixel of the first display area and the second display area in each of a plurality of reference gray levels among the plurality of gray levels.

According to some embodiments, the correction unit may correct a gamma voltage for each sub-pixel for each of gray levels except for the reference gray levels among the plurality of gray levels may be corrected by interpolation of gamma voltages for each sub-pixel of the reference gray levels.

According to some embodiments, a plurality of second areas may be designated, and an average of measured light characteristics of the plurality of second areas may be set as the second target light characteristics.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
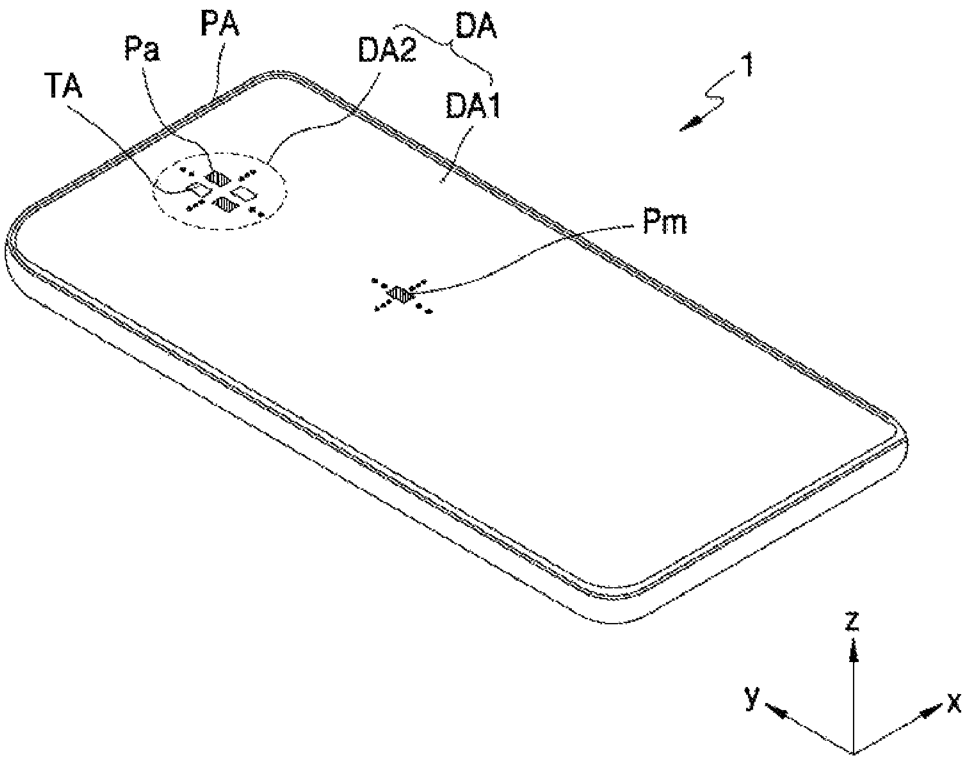
FIG. 1 is a perspective view schematically illustrating a display device according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, aspects of some embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Because various modifications and various embodiments of the present disclosure are possible, specific embodiments are illustrated in the drawings and described in detail in the detailed description. Characteristics and features of embodiments according to the present disclosure, and a method of achieving them will be more apparent with reference to embodiments described below in more detail in conjunction with the drawings. However, the present disclosure is not limited to the embodiments disclosed herein, but may be implemented in a variety of forms.

Hereinafter, aspects of some embodiments of the present disclosure will be described in more detail with reference to the accompanying drawings, and the same or corresponding elements are denoted by the same reference numerals, and the same reference numerals are assigned and some redundant explanations may be omitted.

In the following embodiments, when a component such as a layer, a film, a region, a plate or the like is "on" another element, this is not only when the element is "directly on" another element, but also when other elements are interposed therebetween. In the drawings, for convenience of explanation, the sizes of elements may be exaggerated or reduced. For example, since the size and thickness of each element shown in the drawings are arbitrarily indicated for convenience of explanation, embodiments are not necessarily limited to the illustration.

In the following embodiments, when referred to as a "planar", it means when a target portion is viewed from above, and when referred to as a "cross-sectional view", it means when a cross section of the target portion cut vertically is viewed from a side. In the following embodiments, a first element means that a first element that "overlaps" a second element is located above or below the second element.

In the following embodiments, the x-axis, the y-axis, and the z-axis are not limited to three axes on a Cartesian coordinate system, and may be interpreted in a broad sense including the same. For example, the x-axis, the y-axis, and the z-axis may be perpendicular to each other, but may refer to different directions that are not orthogonal to each other.

FIG. 1 is a perspective view schematically illustrating a display device according to some embodiments.

Referring to FIG. 1, a display device 1 may include a display area DA and a peripheral area PA outside (e.g., in a periphery or outside a footprint of) the display area DA. The display area DA may include a first display area DA1 and a second display area DA2. The first display area DA1 may at least partially (or entirely) surround the second display area DA2. The first display area DA1 and the second display area DA2 may display images separately or together. The peripheral area PA may be a kind of a non-display area in which no display elements are located and no images are displayed. The display area DA may be entirely surrounded by the peripheral area PA.

FIG. 1 illustrates that one second display area DA2 is in the first display area DA1. According to some embodiments, the display device 1 may have two or more second display areas DA2, and the shapes and sizes of the plurality of second display areas DA2 may be different from each other. When viewed in a direction perpendicular (or substantially perpendicular) or normal to an upper surface of the display device 1 (e.g., in a plan view), the shape of the second display area DA2 may have various shapes such as a circular shape, an oval shape, a polygonal shape such as a quadrangle, a star shape, or a diamond shape. FIG. 1 illustrates that the second display area DA2 is at an upper center (+y direction) of the first display area DA1 having a substantially rectangular shape when viewed from a direction perpendicular (or substantially perpendicular) or normal to an upper surface of the display device 1 (e.g., in a plan view), but the second display area DA2 may also be located at one side, for example, a right upper side or a left upper side of the first display area DA1.

The display device 1 may provide or display images using a plurality of first pixels Pm arranged in the first display area DA1 and a plurality of second pixels Pa arranged in the second display area DA2.

As described below with reference to FIG. 2, a component 40, which is an electronic element, may be located at a lower portion of the display panel to correspond to the second display area DA2. The component 40 may be a camera using infrared or visible rays, and may include an imaging device. Alternatively, the component 40 may be a solar cell, a flash, an illuminance sensor, a proximity sensor, and an iris sensor. Alternatively, the component 40 may also have a function of receiving sound. A plurality of components 40 may be arranged in the second display area DA2. The plurality of components 40 may have different functions from each other. For example, the plurality of components 40 may include at least two of a camera (imaging device), a solar cell, a flash, a proximity sensor, an illuminance sensor, and an iris sensor.

In order to minimize or reduce limitations on the function of the component 40, the second display area DA2 may include a transmission area TA through which light or/and sound output from the component 40 to the outside or proceeding toward the component 40 from the outside may transmit or pass. In the display panel and the display device including the same according to some embodiments, when light transmits through the second display area DA2, light transmittance may be about 10% or more, more particularly, 40% or more, 25% or more, 50% or more, 85% or more, or 90% or more.

A plurality of second pixels Pa may be arranged in the second display area DA2. The plurality of second pixels Pa may emit light to provide or display a certain image. The second display area DA2 may have lower resolution than the resolution of the first display area DA1. That is, the second display area DA2 may include a transmission area TA through which light and sound may transmit or pass, and when no pixels are arranged in the transmission area TA, the number of second pixels Pa that may be arranged per unit area, may be less than the number of first pixels Pm arranged per unit area.

The first pixel Pm and the second pixel Pa may be sub-pixels that emit light of a certain color. The first pixels Pm may include first sub-pixels that emit light of a first color, second sub-pixels that emit light of a second color, and third sub-pixels that emit light of a third color. The second pixels Pa may include first sub-pixels, second sub-pixels, and third sub-pixels. According to some embodiments, the first sub-pixels may be red pixels, and the second sub-pixels may be green pixels, and the third sub-pixels may be blue pixels.

Figure 2:
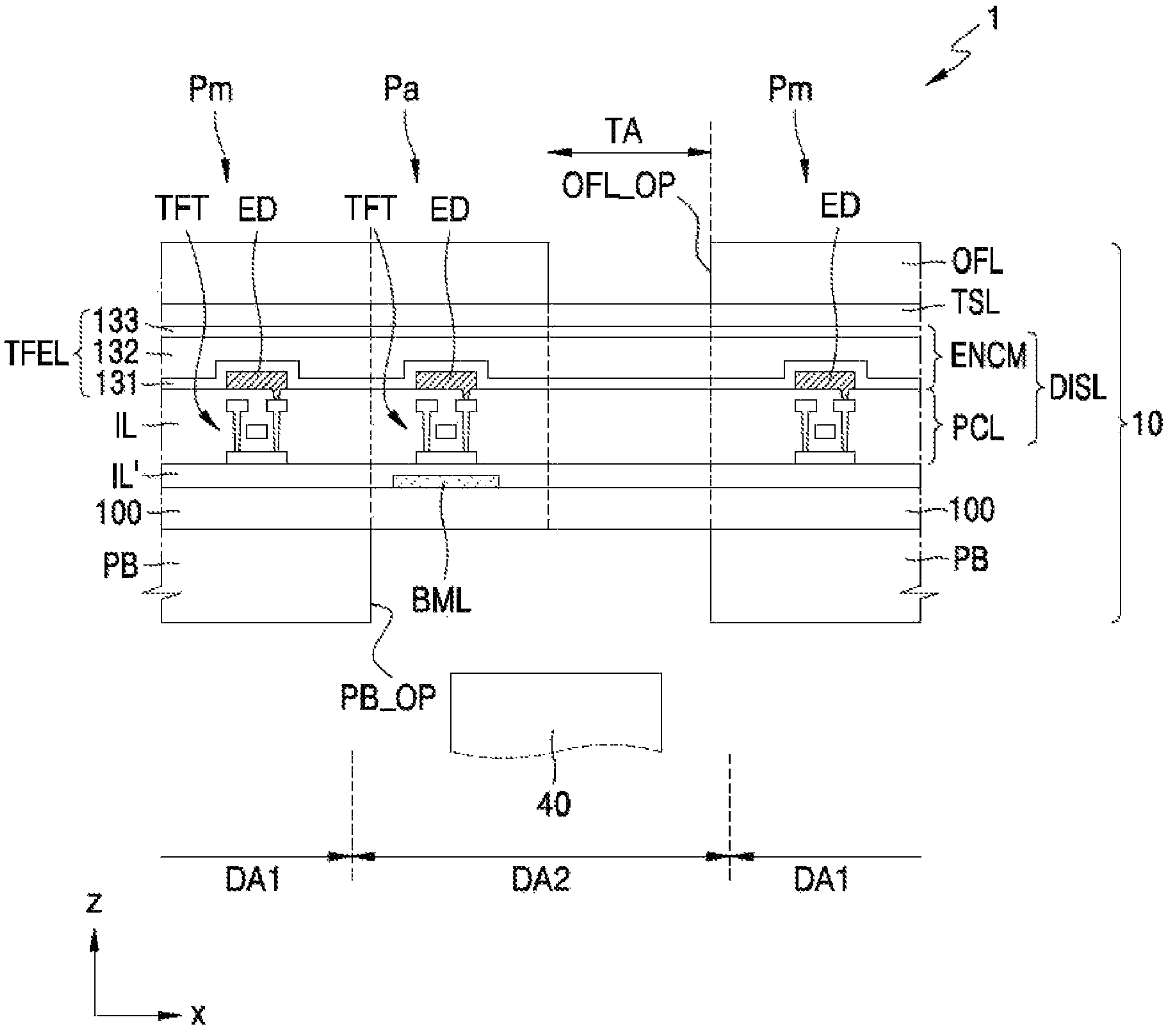
FIG. 2 is a cross-sectional view schematically illustrating a portion of a cross-section of the display device according to some embodiments.

FIG. 2 is a cross-sectional view schematically illustrating a portion of a cross-section of the display device according to some embodiments.

Referring to FIG. 2, a display device 1 may include a display panel 10 and a component 40 that overlaps the display panel 10. A cover window for covering the display panel 10 may be further located on the display panel 10.

The display panel 10 may include a first display area DA1 and a second display area DA2 that overlaps the component 40. The display panel 10 may include a substrate 100, a display layer DISL on the substrate 100, a touch screen layer TSL, an optical functional layer OFL, and a panel protection member PB located at a lower portion of the substrate 100.

The display layer DISL may include a circuit layer PCL including a thin film transistor TFT, a light-emitting element ED that is a display element, and an encapsulation member ENCM such as a thin film encapsulation layer TFEL or a sealing substrate. Insulating layers IL and IL' may be located between the substrate 100 and the display layer DISL, i.e., in the display layer DISL.

The substrate 100 may include an insulating material such as glass, quartz, polymer resin or the like. The substrate 100 may be a rigid substrate or a flexible substrate that may be bent, folded or rolled.

A first pixel Pm may be located in the first display area DA1, and a second pixel Pa may be located in the second display area DA2 of the display panel 10. Each of the first pixel Pm and the second pixel Pa may include a light-emitting element ED and a pixel circuit connected to the light-emitting element ED. The pixel circuit may include a plurality of thin film transistors TFT and at least one capacitor. An area in which the light-emitting element ED is located, and a transmission area TA in which no light-emitting element ED is located, may be in the second display area DA2. The transmission area TA is a periphery of the area in which the light-emitting element ED is located. The transmission area TA may be an area through which light/signal emitted from or incident onto the component 40 corresponding to the second display area DA2 transmits.

The circuit layer PCL and the light-emitting element ED may be covered by the thin film encapsulation layer TFEL or the sealing substrate. In some embodiments, the thin film encapsulation layer TFEL may include at least one inorganic encapsulation layer and at least one organic encapsulation layer, as shown in FIG. 2. According to some embodiments, the thin film encapsulation layer TFEL may include first and second inorganic encapsulation layers 131 and 133 and an organic encapsulation layer 132 therebetween.

The first inorganic encapsulation layer 131 and the second inorganic encapsulation layer 133 may include one or more inorganic insulating materials such as silicon oxide ($SiO_2$), silicon nitride ($SiN_x$), silicon oxynitride ($SiO_xN_y$), aluminum oxide ($Al_2O_3$), titanium oxide ($TiO_2$), tantalum oxide ($Ta_2O_5$), hafnium oxide ($HfO_2$), or zinc oxide ($ZnO_2$). The organic encapsulation layer 132 may include a polymer-based material. The polymer-based material may include a silicon-based resin, an acryl-based resin, an epoxy-based resin, polyimide, and polyethylene.

The first inorganic encapsulation layer 131, the organic encapsulation layer 132, and the second inorganic encapsulation layer 133 may be integrally formed to cover the first display area DA1 and the second display area DA2.

When the encapsulation member ENCM is a sealing substrate, the sealing substrate may be arranged to face the substrate 100 with the display element therebetween. A gap may exist between the sealing substrate and the light-emitting element ED. The sealing substrate may include glass. A sealant including a frit or the like may be arranged between the substrate 100 and the sealing substrate, and the sealant may be located in the above-described peripheral area PA. The sealant located in the peripheral area PA may surround the display area DA and may prevent or reduce contaminants or moisture penetrating through a side surface.

The touch screen layer TSL may obtain coordinate information according to an external input, for example, a touch event. The touch screen layer TSL may include a touch electrode and touch wirings connected to the touch electrode. The touch screen layer TSL may detect the external input using a self-capacitance method or a mutual capacitance method.

The touch screen layer TSL may be formed on the encapsulation member ENCM. Alternatively, the touch screen layer TSL may be separately formed on the touch substrate and then may be coupled to the encapsulation member ENCM through an adhesive layer such as an OCA. According to some embodiments, the touch screen layer TSL may be formed directly on the encapsulation member ENCM, and in this case, the adhesive layer may not be located between the touch screen layer TSL and the encapsulation member ENCM.

The optical functional layer OFL may include an anti-reflection layer. The anti-reflection layer may be configured to reduce the reflectivity of light (external light) incident toward the display device 1 from the outside.

In some embodiments, the optical functional layer OFL may be a polarization film. The optical functional layer OFL may include an opening OFL_OP that corresponds to the transmission area TA. Thus, the light transmittance of the transmission area TA may be remarkably enhanced. A transparent material such as an optically clear resin (OCR) may be filled in the opening OFL_OP.

In some embodiments, the optical functional layer OFL may include a filter plate including a black matrix and color filters.

In some embodiments, the optical functional layer OFL may further include a multi-layered structure on the anti-reflection layer. The multi-layered structure may include a first layer and a second layer on the first layer. The first layer and the second layer may include organic insulating materials, and may have different refractive indexes. For example, the refractive index of the second layer may be greater than the refractive index of the first layer.

A cover window may be located on the display panel 10 to protect the display panel 10. The optical functional layer OFL may be attached to the cover window by using an OCA or to the touch screen TSL by using an OCA.

The panel protection member PB may be attached to the lower portion of the substrate 100 to support and protect the substrate 100. The panel protection member PB may include an opening PB_OP corresponding to the second display area DA2. The opening PB_OP may be included in the panel protection member PB so that the light transmittance of the second display area DA2 may be enhanced. The panel protection member PB may include polyethyleneterepthalate (PET) or polyimide (PI).

The area of the second display area DA2 may be greater than the area in which the component 40 is located. Thus, the area of the opening PB_OP in the panel protection member PB may not coincide with the area of the second display area DA2.

In the display device 1 according to some embodiments, a bottom metal layer BML may be located in the second display area DA2. The bottom metal layer BML may be arranged to correspond to a lower portion of the thin film transistor TFT of the second display area DA2. For example, the bottom metal layer BML may be between the thin film transistor TFT and the substrate 100. The bottom metal layer BML may prevent or reduce instances of external light reaching the auxiliary thin film transistor TFT. In some embodiments, a constant voltage or a signal may be applied to the bottom metal layer BML. The bottom metal layer BML may prevent or reduce instances of external light reaching the light-emitting element ED. The lower metal layer BML may be formed to correspond to the entirety of the second display area DA2, and may include a lower-hole corresponding to the transmission area TA. In this case, the lower-hole may be provided in various shapes such as a polygonal shape, a circular shape, or an atypical shape to control diffraction characteristics of external light.

Figure 3:
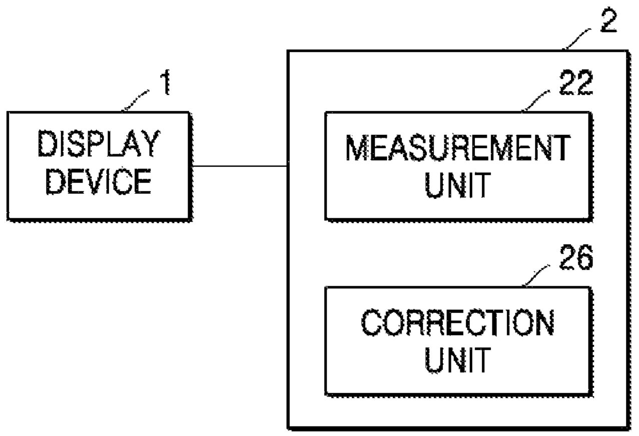
FIG. 3 is a view schematically illustrating a gamma voltage correction device for the display device according to some embodiments.
Figure 4:
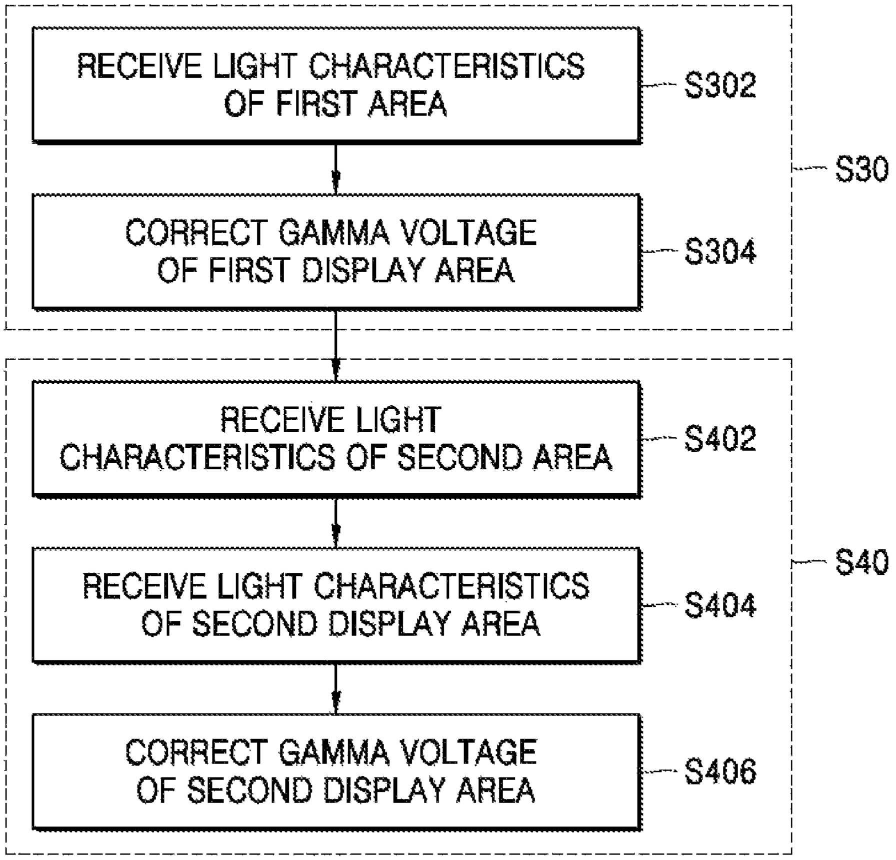
FIG. 4 is a view schematically illustrating a gamma voltage correction method for the display device according to some embodiments.
Figure 5:
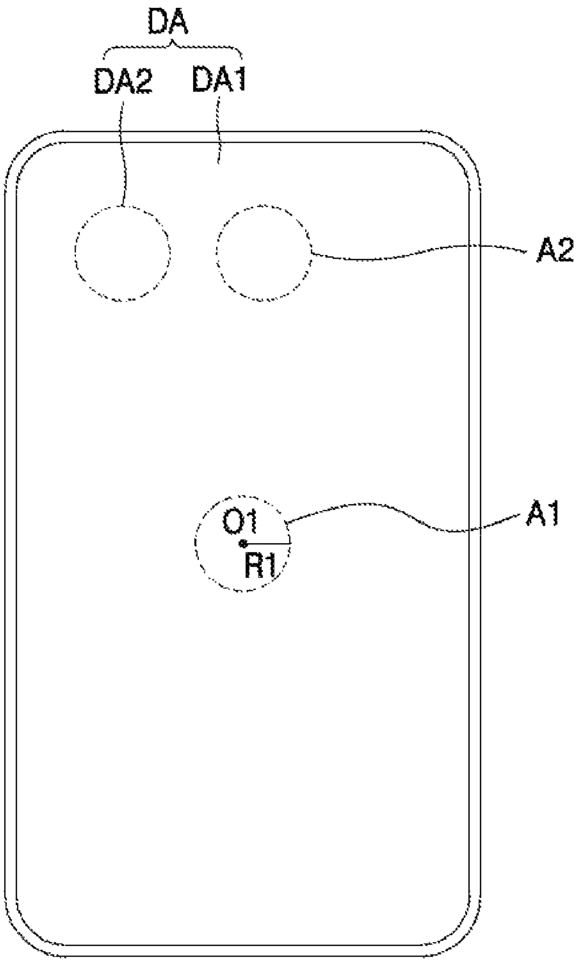
FIGS. 5, 6A, and 6B are views schematically illustrating an inspection area of a display area according to some embodiments.
Figure 6A:
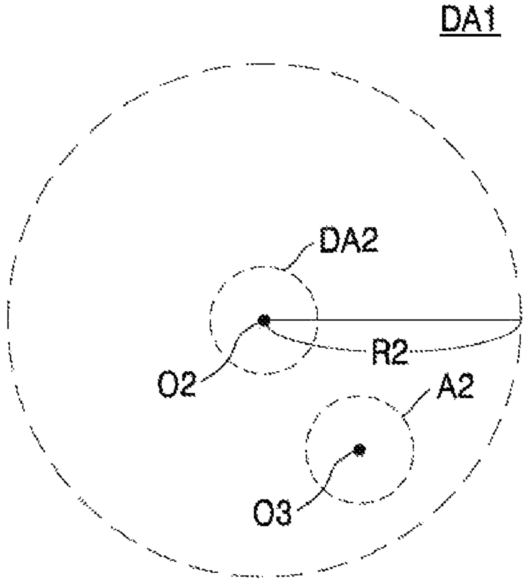
Figure 6B:
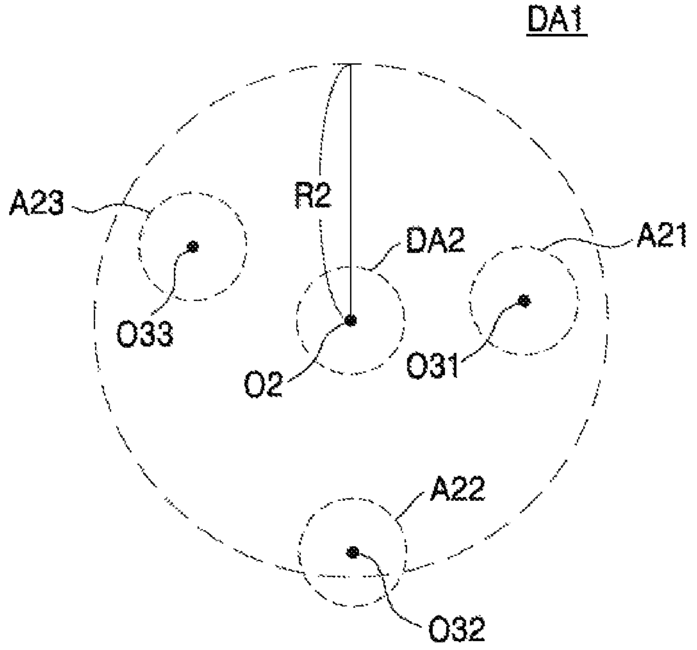
Figure 7:
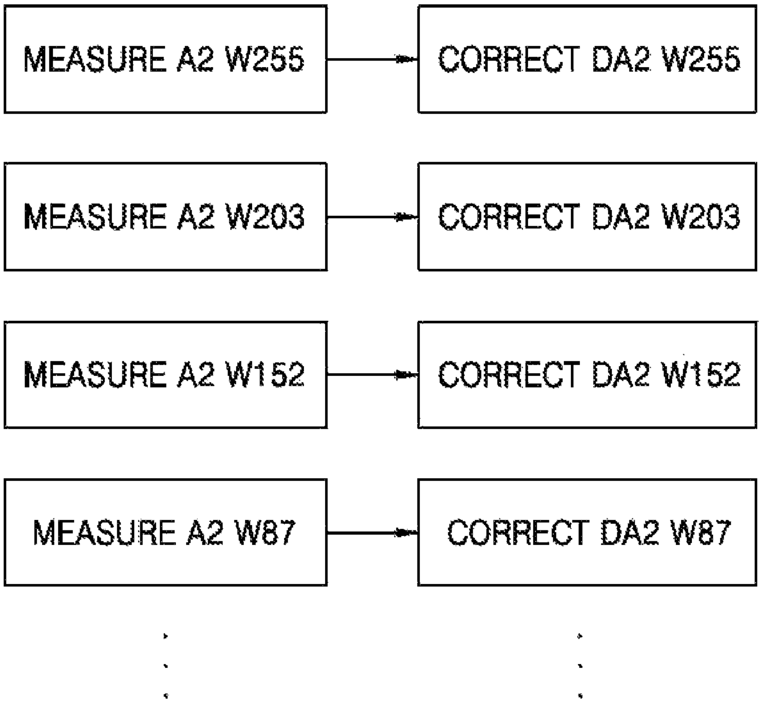
FIG. 7 is a view schematically illustrating a gamma voltage correction of a second display area according to some embodiments.

FIG. 3 is a view schematically illustrating a gamma voltage correction device for the display device according to some embodiments. FIG. 4 is a view schematically illustrating a gamma voltage correction method for the display device according to some embodiments. FIGS. 5, 6A, and 6B are views schematically illustrating an inspection area of a display area according to some embodiments. FIG. 7 is a view schematically illustrating a gamma voltage correction of a second display area according to some embodiments.

According to some embodiments, the gamma voltage correction method illustrated in FIG. 4 may be performed on the display device 1 illustrated in FIG. 1 by using the gamma voltage correction device 2. The gamma voltage correction device 2 may measure light characteristics of the display device 1 to correct (adjust) gamma voltages. The gamma voltage correction device 2 may correct a gamma voltage in each of the first display area DA1 and the second display area DA2 of the display device 1.

When the image quality of the display device (for example, the characteristics of Front of Screen) does not reach a target value due to a deviation in a manufacturing process, a corresponding product may be determined to be defective. All finished products which cannot reach the target value may be determined as defective and discarded, the yield may be significantly reduced, and thus post-correction may be required to match the image quality of the display device to the target value.

There may be gamma as one of important factors for improving the display quality of the display device. The gamma is a correlation between a gray level and a luminance, and may be defined as a gamma curve. In order to maintain a stable display quality, an accurate gamma setting is required. When an error occurs in gamma setting, a deviation between the luminance (display luminance) actually displayed and the luminance (target luminance) corresponding to the gray level may occur. The gamma voltage is a voltage input to the driving circuit to generate a driving voltage or a driving current so that the pixel emits light with a luminance corresponding to a specific gray level according to the gamma curve. When the gamma voltage is changed, the driving voltage or the driving current is changed, and thus luminance and/or color coordinates corresponding to the gray level are changed. According to some embodiments, the gamma voltage may be corrected such that a difference between light characteristics of an image displayed on the display device and target light characteristics is minimized. According to some embodiments, the gamma voltage correction of the first display area DA1 and the second display area DA2 may be performed separately.

Hereinafter, a method for correcting a gamma voltage of a display device will be described with reference to FIGS. 3 to 7.

The gamma voltage correction device 2 according to some embodiments may include a measurement unit (or measurer, or measurement circuit, or measurement component) 22 and a correction unit (or corrector, or correction circuit, or correction component) 26.

The measurement unit 22 may measure light characteristics of the display device 1. The light characteristics may include luminance and/or color coordinates. The measurement unit 22 may be optical equipment including an imaging unit.

The display device 1 may display an image by a signal (for example, a data signal) generated on the basis of a gamma voltage for each sub-pixel corresponding to a specific gray level according to a preset gamma value. The gamma voltage for each sub-pixel corresponding to a specific gray level may refer to a gamma voltage of a first sub-pixel, a gamma voltage of a second sub-pixel, and a gamma voltage of a third sub-pixel corresponding to a specific gray level.

The measurement unit 22 may measure light characteristics of a portion of the display area DA in which light emits with a specific gray level. According to some embodiments, as shown in FIG. 5, light characteristics of the first area A1 and the second area A2 in the first display area DA1 and the second display area DA2 may be measured. The measurement unit 22 may measure light characteristics of sub-pixels in the first area A1, the second area A2, and the second display area DA2. The second area A2 of the first display area DA1 may be disposed closer to the second display area DA2 than the first area A1 of the first display area DA1.

The first area A1 may be an area within a distance R1 having a center O1 of the center of the display area DA in the first display area DA1. The second area A2 may be an area around the second display area DA2 in the first display area DA1. As illustrated in FIGS. 6A and 6B, a center O3 of the second area A2 may be located within an area excluding the second display area DA2 from an area in a distance R2 from a center O2 of the second display area DA2 in the first display area DA1. The area of the second area A2 may be equal or greater than the area of the second display area DA2. The distance R2 may be twice to three times the radius of the second display area DA2.

As illustrated in FIG. 6A, light characteristics in one second area A2 may be measured. As illustrated in FIG. 6B, light characteristics in a plurality of second areas A21, A22, and A23 having different centers O31, O32, and O33 may be measured. According to some embodiments, light characteristics may be measured by using the entire area except for the second display area DA2 as the second area A2 in the area within the distance R2 from the center O2 of the second display area DA2 in the first display area DA1.

According to some embodiments, the measurement unit 22 may include a first measurement unit for measuring light characteristics of the second area A2 and a second measurement unit for measuring light characteristics of the second display area DA2. The first measurement unit and the second measurement unit may measure light characteristics of the second area A2 and the second display area DA2 respectively or simultaneously.

The correction unit 26 may compare light characteristics measured by the measurement unit 22 (hereinafter, referred to as "measured light characteristics") measured by the measurement unit 22 with target light characteristics. The target light characteristics may be a target luminance and a target color coordinate corresponding to each gray level according to a preset gamma curve. The measured light characteristics may be measured luminance and measured color coordinates obtained by measurement of each gradation image actually displayed in the display area DA according to a data signal generated based on a gamma voltage for each sub-pixel set in the target luminance and the target color coordinates.

The correction unit 26 may determine whether a difference between the measured light characteristics and the target light characteristics (hereinafter, referred to as a 'light characteristic difference') is within a reference range, and may correct the gamma voltage such that the light characteristic difference is within a reference range on the basis of the determination result. According to some embodiments, gamma voltage correction may mean generation of correction data for gamma voltage correction. The correction data may include an offset of a gamma voltage calculated based on a preset gamma curve.

The correction unit 26 may correct a gamma voltage by determining the light characteristic difference with respect to each of a plurality of reference gray levels. The correction unit 26 may generate correction data for correction of the gamma voltage by determining the light characteristic difference with respect to each of a plurality of reference gray levels. The correction unit 26 may receive measurement light characteristics from the measurement unit 22 at each of the reference gray levels, and may generates correction data for correcting the gamma voltage according to a determination result of whether the light characteristic difference is within a reference range. The reference gray level may be a gray level selected from among a plurality of gray levels. According to some embodiments, the reference gray levels may be gray levels (for example, 255 gray level, 203 gray level, 152 gray level, 87 gray level, etc.) among 0 to 255 gray levels (256 gray levels) having an interval of 1 used in the display device 1.

Referring to FIG. 4, the correction unit 26 may correct a gamma voltage for each sub-pixel of the first display area DA1 based on light characteristics measured with respect to a first area A1 of the first display area DA1 with respect to each of a plurality of gray levels (S30). The correction unit 26 may correct a gamma voltage for each sub-pixel of the second display area DA2 based on light characteristics measured in the second area A2 of the first display area DA1 and light characteristics measured in the second display area DA2 (S40). Hereinafter, for convenience of explanation, gamma voltage correction in one of reference gray levels, for example, 255 gray level will be illustratively described.

The correction unit 26 may receive measured light characteristics of the first area A1 of the display area DA of the display device 1 that emits light with 255 gray level, from the measurement unit 22 (S302).

The correction unit 26 may correct a gamma voltage for each sub-pixel of the first display area DA1 with respect to 255 gray level based on the measured light characteristics of the first area A1 (S304). The correction unit 26 may correct correction data of the gamma voltage for each sub-pixel of the first display area DA1 with respect to 255 gray level based on the measured light characteristics of the first area A1.

The correction unit 26 may compare the measured light characteristics of the first area A1 with preset target light characteristics (first target light characteristics) and may determine whether a difference between the light characteristics is within a reference range. The correction unit 26 may generate correction data of the gamma voltage for each sub-pixel in which the difference between the light characteristics is within the reference range, based on a determination result. The correction data of the gamma voltage for each sub-pixel with 255 gray level generated based on the measured light characteristics of the first area A1 may be correction data of the gamma voltage for each sub-pixel with respect to 255 gray level of the first display area DA1.

The correction unit 26 may receive measured light characteristics of the second area A2 of the display area DA of the display device 1 that emits light with 255 gray level, from the measurement unit 22 (S402). The correction unit 26 may set the measured light characteristics of the second area A2 to target light characteristics (second target light characteristics) of the second display area DA12.

The correction unit 26 may receive measured light characteristics of the second display area DA2 of the display area DA of the display device 1 that emits light with 255 gray level, from the measurement unit 22 (S404).

The correction unit 26 may correct a gamma voltage for each sub-pixel of the second display area DA2 with respect to 255 gray level based on the measured light characteristics of the second display area DA2 and the measured light characteristics of the second area A2 (S406). The correction unit 26 may generate correction data of the gamma voltage for each sub-pixel of the second display area DA2 with respect to 255 gray level based on the measured light characteristics of the second display area DA2 and the measured light characteristics of the second area A2.

The correction unit 26 may compare the measured light characteristics of the second display area DA2 with second target light characteristics and may determine whether a difference between the light characteristics is within a reference range. The correction unit 26 may generate correction data of the gamma voltage for each sub-pixel in which the difference between the light characteristics is within the reference range, based on a determination result.

The correction unit 26 may perform operations S30 and S40 described above in each of the reference gray levels to generate correction data for correcting the gamma voltage for each sub-pixel of the first display area DA1 and the second display area DA2 with respect to each of the reference gray levels. The correction unit 26 may generate correction data of a gamma voltage for each sub-pixel for each of n reference gray levels selected from 256 gray levels. For example, as shown in FIG. 7, the gamma voltage correction device (or gamma voltage correction component, or gamma voltage corrector, or gamma voltage correction circuit) 2 may measure the light characteristics of the second area A2 displayed with white 255 gray level, may measure the light characteristics of the second display area DA2 displayed with the white 255 gray level and may correct the gamma voltage by using the measured light characteristics of the second area A2 as the second target light characteristics. The gamma voltage correction device 2 may measure the light characteristics of the second area A2 in each of white 203 gray level, white 152 gray level, and white 87 gray level, etc., may measure the light characteristics of the second display area DA2 and may correct the gamma voltage by using the measured light characteristics of the second area A2 as the second target light characteristics.

The gamma voltage correction device 2 may correct the gamma voltage repeatedly. According to some embodiments, the gamma voltage correction device 2 may perform a multi-time programming (MTP) operation for correcting the gamma voltage of the display device 1 repeatedly in the terms of luminance and/or color coordinates. That is, the MTP operation may be repeated execution of light characteristics measurement and gamma voltage correction. When a difference between the measured light characteristics and the target light characteristics is out of the reference range, a voltage level of the gamma voltage may be compensated for or corrected (adjusted). Subsequently, the light characteristics of the display device 1 for displaying an image may be re-measured according to a signal (e.g., a data signal) generated based on the compensated (or corrected) gamma voltage, and it may be determined again whether a difference between the re-measured light characteristics and the target light characteristics is within a reference range. The gamma voltage correction device 2 may adjust the voltage level of the gamma voltage repeatedly until the difference between the measured light characteristics and the target light characteristics is within a reference range. When the difference between the measured light characteristics and the target light characteristics is within the reference range, the correction unit 26 of the gamma voltage correction device 2 may determine a finally-corrected (adjusted) gamma voltage. The gamma voltage correction device 2 may correct a gamma voltage by performing an MTP operation with respect to each of a plurality of reference gray levels.

According to some embodiments, the gamma voltage correction of the second display area DA2 may be performed after the gamma voltage correction of the first display area DA1 is performed. After gamma voltage correction of the first area A1 is performed, light characteristics of the second area A2 and the second display area DA2 may be measured. According to some embodiments, an image for measuring the light characteristics of the second area A2 and the second display area DA2 may be the same as an image measured initial light characteristics of the first area A1. According to some embodiments, an image for measuring the light characteristics of the second area A2 and the second display area DA2 may be the same as an image measured last light characteristics of the first area A1.

The correction unit 26 may correct a gamma voltage for each sub-pixel with respect to gray levels except for reference gray levels by interpolation of gamma voltages for each sub-pixel of reference gray levels. The correction unit 26 may calculate correction data of a gamma voltage for each sub-pixel with respect to gray levels except for reference gray levels by interpolation of correction data of gamma voltages for each sub-pixel of reference gray levels. Here, the interpolation method is not particularly limited, and various interpolation methods such as linear interpolation known in the art may be used.

According to some embodiments, the gamma voltage correction device 2 may include a storage unit for storing correction data generated by the correction unit 26. The storage unit may be a register that may be programmed a plurality of times.

According to some embodiments of the disclosure, gamma voltage correction of the second display area DA2 may be performed by using the light characteristics of the second area A2 around the second display area DA2 as target light characteristics so that a difference between Front of Screen characteristics of the second display area DA2 and around the second display area DA2.

Figure 8:
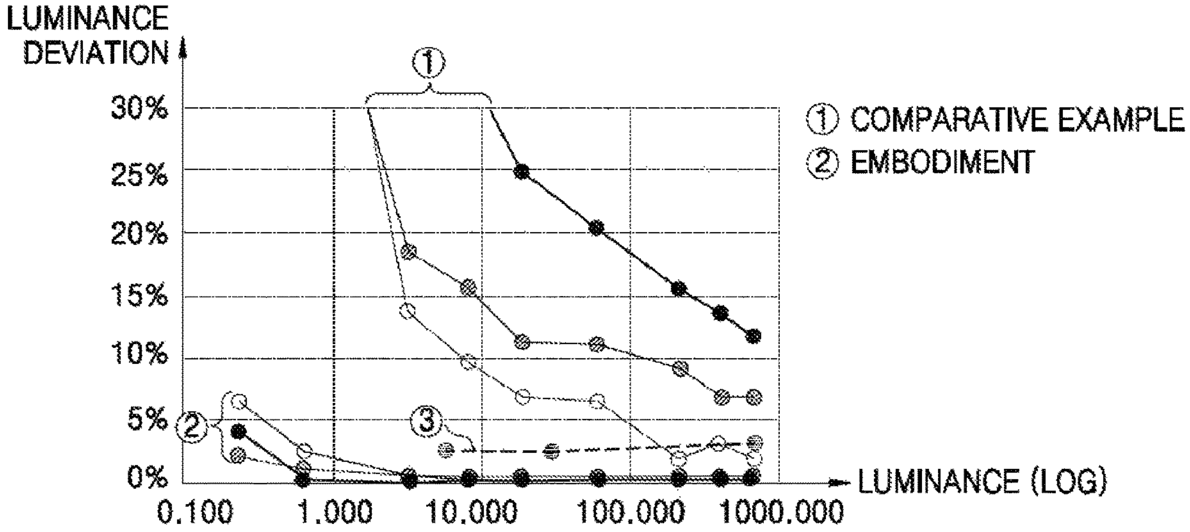
FIG. 8 is a graph illustrating luminance uniformity of a display device according to some embodiments.
Figure 9:
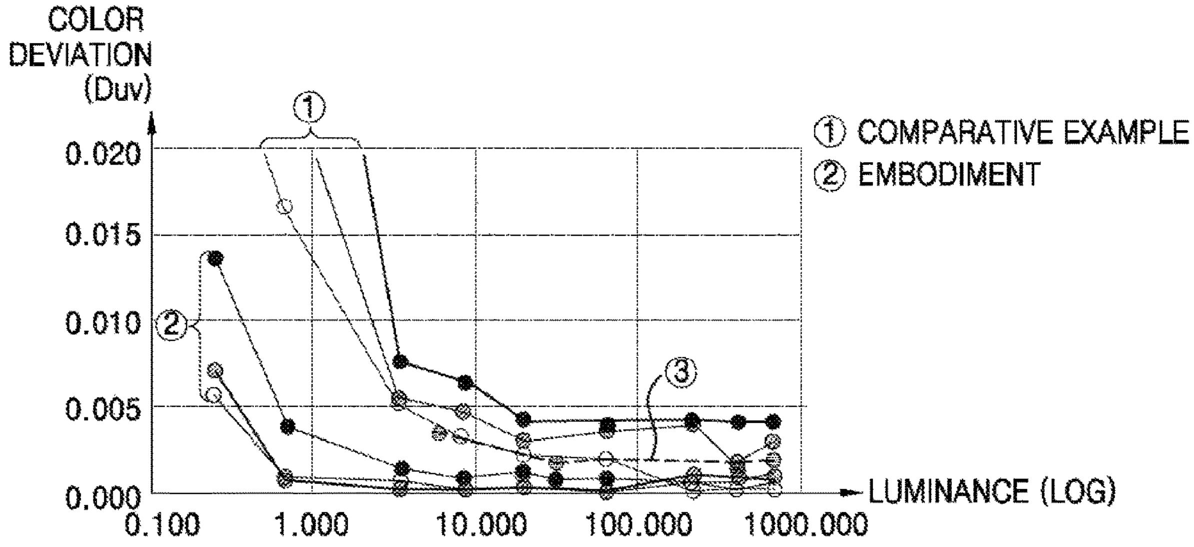
FIG. 9 is a graph illustrating color uniformity of a display device according to some embodiments.

FIG. 8 is a graph illustrating luminance uniformity of a display device according to some embodiments. FIG. 9 is a graph illustrating color uniformity of a display device according to some embodiments.

In the graphs of FIGS. 8 and 9, the x-axis is an axis representing luminance corresponding to a gray level and is represented as a log value. In the graph of FIG. 8, the y-axis represents a luminance deviation between the second area and the second display area, and in the graph of FIG. 9, the y-axis represents a color deviation between the second area and the second display area. In FIGS. 8 and 9, the graphs ① of comparative example show examples in which materials of display device are different from each other, and the graphs ② of the disclosure show examples in which different materials of display device are different from each other. The comparative example is a case where the target light characteristics for the MTP operation of the second display area DA2 is the same as the target light characteristics for the MTP operation of the first area A1.

As shown in FIGS. 8 and 9, it can be seen that, in the graphs ②, the luminance deviation and color deviation between the second area and the second display area are small compared to the graphs ①. Also, as shown in FIGS. 8 and 9, it can be seen that, in the graphs ②, the luminance deviation and color deviation between the second area and the second display area are small compared to the reference graph ③ except for a low gray level.

Figure 10:
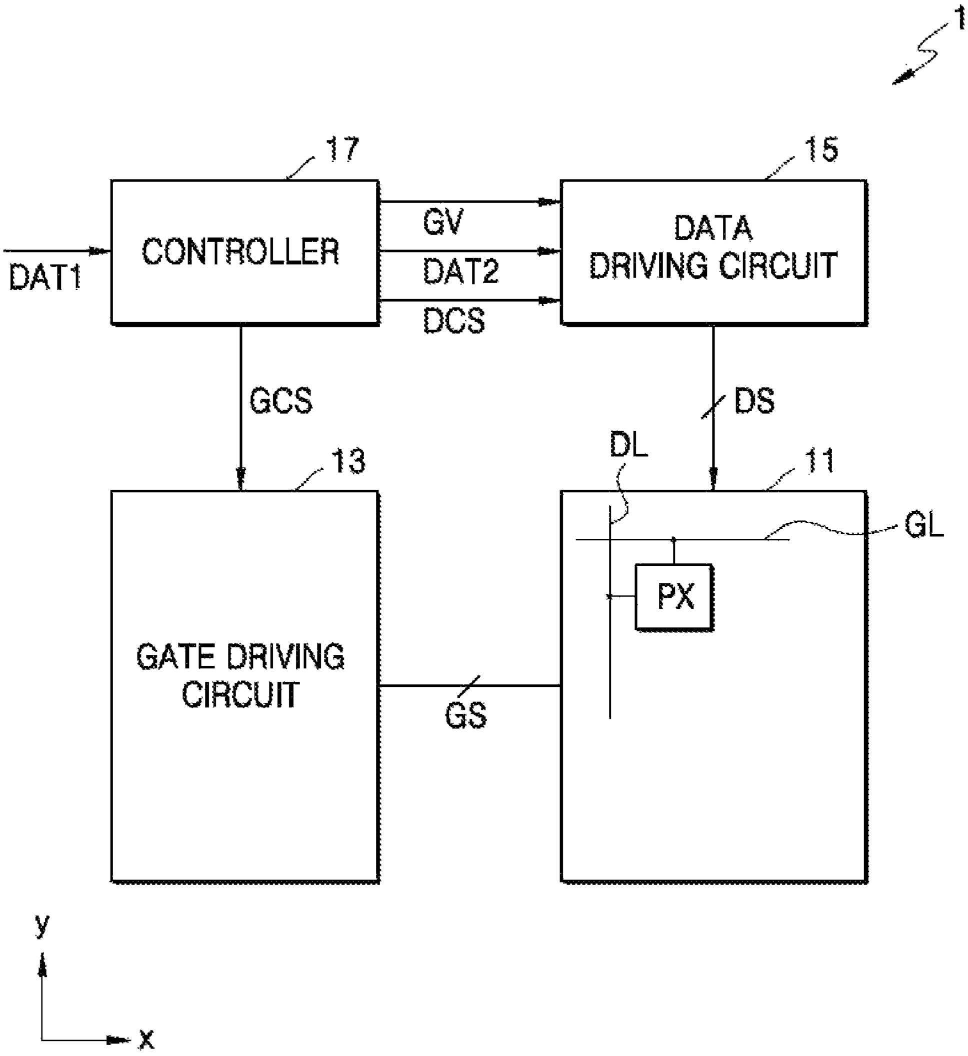
FIG. 10 is a view schematically illustrating a display device according to some embodiments.

FIG. 10 is a view schematically illustrating a display device according to some embodiments.

Referring to FIG. 10, the display device 1 may include a pixel unit 11, a gate driving circuit 13, a data driving circuit 15, and a controller 17.

A plurality of pixels PX, and signal lines for applying electrical signals to the plurality of pixels PX may be located in the pixel unit 11. The pixel unit 11 may be a display area in which an image is displayed.

The plurality of pixels PX may be repeatedly arranged in a first direction (an x direction, a row direction) and a second direction (a y direction, a column direction). The plurality of pixels PX may be arranged in various forms such as a stripe arrangement, a pentile arrangement, a mosaic arrangement, and the like so as to implement images. Each of the plurality of pixels PX may include an organic light-emitting diode as a display element, and the organic light-emitting diode may be connected to a pixel circuit. The pixel circuit may include a plurality of transistors and at least one capacitor.

Signal lines for applying electrical signals to the plurality of pixels PX may include a plurality of gate lines GL extending in the first direction, and a plurality of data lines DL extending in the second direction. The plurality of gate lines GL may be arranged in the second direction, and may transmit a gate signal GS to the pixels PX. The plurality of data lines DL may be spaced apart from each other in the first direction, and may transmit a data signal DS to the pixels PX. Each of the plurality of pixels PX may be connected to at least one corresponding gate line among the plurality of gate lines GL, and a corresponding data line among the plurality of data lines DL. For convenience of illustration, FIG. 10 illustrates that one gate line is connected to the pixels PX, but each pixel PX may be connected to a plurality of gate lines according to the number of transistors that constitute a pixel circuit.

The gate driving circuit 13 may be connected to the plurality of gate lines GL, may generate a gate signal GS in response to a control signal GCS from the controller 17, and may supply the gate signal GS to gate lines GL sequentially.

The data driving circuit 15 may be connected to the plurality of data lines DL, and may supply the data signal DS to data lines DL in response to the control signal DCS from the controller 17. The data driving circuit 15 may receive gamma voltages GV and image data DAT2 corresponding to each of gray levels from the controller 17, and may generate the data signal DS corresponding to gray levels.

The controller 17 may generate a gate control signal GCS and a data control signal DCS based on signals input from the outside. The controller 17 may supply the gate control signal GCS to the gate driving circuit 13, and may supply the data control signal DCS to the data driving circuit 15.

The controller 17 may convert input image data DAT1 input from the outside (e.g., a graphic processor) to generate image data DAT2. For example, the controller 17 may convert the input image data DAT1 in an RGB format into image data DAT2 having a format suitable for the pixel arrangement of the pixel unit 11. The controller 17 may include a storage unit in which gamma voltages corresponding to gray levels and correction data are recorded.

FIG. 10 illustrates that the data driving circuit 15 and the controller 17 are independently implemented, but embodiments are not limited thereto. For example, the data driving circuit 15 and the controller 17 may be implemented with one integrated circuit (IC)(for example, a driving IC).

The display device 1 according to some embodiments may be a display device such as an organic light-emitting display device, an inorganic light-emitting display or an inorganic eletroluminescent (EL) display device, a quantum dot light-emitting display, or the like.

In the above-described embodiments, gamma voltage correction using the display device 1 and a gamma voltage correction device 2 has been described, but embodiments are not limited thereto. According to some embodiments, the correction unit 26 of the gamma voltage correction device 2 illustrated in FIG. 3 may be included in the controller 17 in the IC of the display device 1 illustrated in FIG. 10, and may perform the above-described gamma voltage correction in the controller 17. According to some embodiments, the correction unit 26 of the gamma voltage correction device 2 illustrated in FIG. 3 may be included in an external device such as an application processor (AP).

The display device 1 may be used as a display screen for various products, such as portable electronic devices, for example, mobile phones, smartphones, table personal computers (PCs), mobile communication terminals, electronic notebooks, electronic books, portable multimedia players (PMPs), navigation devices, ultra mobile PCs (UMPC), and the like, and televisions, laptop computers, monitors, billboards, Internet of Things (IOT), and the like. Also, the display device 1 according to some embodiments may be used for wearable devices such as smartwatches, watch phones, glasses type displays, and head mounted displays (HMD). In addition, the display device 1 according to some embodiments may be used as an instrument panel of a vehicle, and a center information display (CID) display located on a center fascia or a dashboard of a vehicle, a room mirror display for replacing a side mirror of a vehicle, and a display located on the rear surface of the front seat.

It will be appreciated that each block of figures and combinations of flowchart figures according to some embodiments can be performed by computer program instructions. Since these computer program instructions can be mounted to a processor of a general purpose computer, a special purpose computer, or other programmable data processing equipment, the instructions executed through the processor of the computer or other programmable data processing equipment generate means for performing the functions described in the flowchart block(s). These computer program instructions may also be stored in a computer-readable memory or using a computer that can direct a computer or other programmable data processing apparatus to function in a particular manner, such that the instructions stored in the computer-readable memory produce an article of manufacture including instruction means that perform the functions specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

In addition, each block may represent a module, segment, or portion of code, which includes one or more executable instructions for executing the specified logical function(s). It should also be noted that in some alternative execution examples the functions recited in the blocks may occur out of order. For example, two blocks shown in succession may in fact be executed substantially concurrently or the blocks may sometimes be executed in the reverse order, depending upon the functionality involved.

The term "~unit" used in the present embodiment refers to a software or hardware component such as a Field Programmable Gate Array (FPGA) or an Application Specific Integrated Circuit (ASIC), and "~unit" performs certain tasks. However, the term "~unit" is not limited to software or hardware. The "~unit" may be configured to be on an addressable storage medium and may be configured to reproduce one or more processors. Thus, as an example, "~unit" includes components such as software components, object-oriented software components, class components, and task components, processes, functions, attributes, procedures, subroutines, segments of program code, drivers, firmware, microcode, circuitry, data, databases, data structures, tables, arrays, and variables. The functions provided in the components and the units may be combined into a smaller number of components and 'units' or may be further divided into additional components and '-units'. In addition, components and '-units' may be implemented to reproduce one or more CPUs in a device or a security multimedia card.

In a gamma voltage correction device and a gamma voltage correction method according to some embodiments, gamma characteristics and image quality of a display device may be relatively improved.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A gamma voltage correction method for a display device, the display device comprising a first display area and a second display area, the second display area being an area corresponding to a component below a display panel of the display device and being surrounded by the first display area, the gamma voltage correction method comprising:

measuring light characteristics of a first area within the first display area;

correcting a gamma voltage for each sub-pixel of the first display area based on a comparison between the measured light characteristics of the first area within the first display area and preset first target light characteristics in a plurality of gray levels;

measuring light characteristics of the second display area and a second area within the first display area located around the second display area; and setting the measured light characteristics of the second area within the first display area as second target light characteristics and correcting a gamma voltage for each sub-pixel of the second display area based on a comparison between the measured light characteristics of the second display area and the second target light characteristics in the plurality of gray levels.

2. The gamma voltage correction method of claim 1, wherein the correcting of the gamma voltage of the first display area comprises:

receiving the measured light characteristics of the first area in each of reference gray levels of the plurality of gray levels; and correcting a gamma voltage for each sub-pixel corresponding to each of the reference gray levels for the first display area based on the comparison between the measured light characteristics of the first area and the preset first target light characteristics.

3. The gamma voltage correction method of claim 2, wherein the correcting of the gamma voltage of the second display area comprises:

receiving the measured light characteristics for the second area of the first display area and measured light characteristics for the second display area in each of reference gray levels; and correcting a gamma voltage for each sub-pixel corresponding to each of the reference gray levels for the second display area based on the comparison between the measured light characteristics of the second display area and the second target light characteristics.

4. The gamma voltage correction method of claim 1, wherein the measured light characteristics comprise luminance and color coordinates.

5. The gamma voltage correction method of claim 1, wherein the first area is an area within a first distance from a center of the first display area.

6. The gamma voltage correction method of claim 1, wherein a center of the second area is in an area excluding the second display area in an area within a second distance from a center of the second display area.

7. The gamma voltage correction method of claim 6, wherein the second distance is twice or more of a radius of the second display area.

8. The gamma voltage correction method of claim 1, further comprising correcting a gamma voltage for each sub-pixel of the first display area and the second display area in each of a plurality of reference gray levels among the plurality of gray levels.

9. The gamma voltage correction method of claim 8, further comprising correcting a gamma voltage for each sub-pixel for each of gray levels except for the reference gray levels among the plurality of gray levels by interpolation of gamma voltages for each sub-pixel of the reference gray levels.

10. The gamma voltage correction method of claim 3, wherein a plurality of second areas are designated, and an average of measured light characteristics of a plurality of second areas is set as second target light characteristics.

11. A gamma voltage correction device comprising:

a measurement circuit configured to measure light characteristics of a display panel, the display panel including a first display area and a second display area, the second display area being an area corresponding to a component below the display panel and being surrounded by the first display area; and a correction circuit configured to correct a gamma voltage for each sub-pixel of the display panel, and wherein the correction circuit is configured to:

correct a gamma voltage for each sub-pixel of the first display area based on a comparison between measured light characteristics of a first area within the first display area and preset first target light characteristics, set measured light characteristics of a second area within the first display area located around the second display area as second target light characteristics, and correct a gamma voltage for each sub-pixel of the second display area based on a comparison between measured light characteristics of the second display area and the second target light characteristics in a plurality of gray levels, wherein the measurement circuit is configured to measure light characteristics of the first area within the first display area to correct the gamma voltage for each sub-pixel of the first display area and to measure light characteristics of both the second display area and the second area within the first display area to correct the gamma voltage for each sub-pixel of the second display area.

12. The gamma voltage correction device of claim 11, wherein the correction circuit is configured to receive the measured light characteristics of the first area from each of reference gray levels among the plurality of gray levels and to correct a gamma voltage for each sub-pixel corresponding to each of the reference gray levels for the first display area based on the comparison between the measured light characteristics of the first area and the preset first target light characteristics.

13. The gamma voltage correction device of claim 12, wherein the correction circuit is configured to:

receive the measured light characteristics of the second area of the first display area and the second display area in each of reference gray levels;

correct a gamma voltage for each sub-pixel corresponding to each of the reference gray levels for the second display area based on the comparison between the measured light characteristics of the second display area and the second target light characteristics.

14. The gamma voltage correction device of claim 11, wherein the measured light characteristics comprise luminance and color coordinates.

15. The gamma voltage correction device of claim 11, wherein the first area is an area within a first distance from a center of the first display area.

16. The gamma voltage correction device of claim 11, wherein a center of the second area is in an area excluding the second display area in an area within a second distance from a center of the second display area.

17. The gamma voltage correction device of claim 16, wherein the second distance is twice or more of a radius of the second display area.

18. The gamma voltage correction device of claim 11, wherein the correction circuit is configured to correct a gamma voltage for each sub-pixel of the first display area and the second display area in each of a plurality of reference gray levels among the plurality of gray levels.

19. The gamma voltage correction device of claim 18, wherein the correction circuit is configured to correct a gamma voltage for each sub-pixel for each of gray levels except for the reference gray levels among the plurality of gray levels by interpolation of gamma voltages for each sub-pixel of the reference gray levels.

20. The gamma voltage correction device of claim 13, wherein a plurality of second areas are designated, and an average of measured light characteristics of a plurality of second areas is set as second target light characteristics.

* * * * *